(12) United States Patent
Schmidt et al.

(10) Patent No.: US 8,804,680 B2
(45) Date of Patent: Aug. 12, 2014

(54) SYSTEM AND METHOD FOR MANAGING WIRELESS CONNECTIONS AND RADIO RESOURCES

(75) Inventors: Jeffrey C. Schmidt, Orlando, FL (US); Donald L. Joslyn, DeBary, FL (US); Manish Shukla, Altamonte Springs, FL (US); Hrishikesh Gossain, Heathrow, FL (US); Mario A. Camchong, Oviedo, FL (US)

(73) Assignee: Spectrum Bridge, Inc., Lake Mary, FL (US)

( * ) Notice: Subject to any disclaimer, the term of this patent is extended or adjusted under 35 U.S.C. 154(b) by 356 days.

(21) Appl. No.: 13/022,087

(22) Filed: Feb. 7, 2011

(65) Prior Publication Data

US 2012/0201143 A1 Aug. 9, 2012

(51) Int. Cl.
| | | |
|---|---|---|
| H04W 4/00 | (2009.01) | |
| H04W 48/18 | (2009.01) | |
| H04W 52/02 | (2009.01) | |
| H04M 1/725 | (2006.01) | |
| H04W 8/06 | (2009.01) | |

(52) U.S. Cl.
CPC ...... H04M 1/72572 (2013.01); *H04M 2250/12* (2013.01); *H04M 2250/10* (2013.01); H04W 48/18 (2013.01); H04W 52/0251 (2013.01); *H04W 8/06* (2013.01); *H04M 2250/06* (2013.01)
USPC .......................................... 370/338

(58) Field of Classification Search
USPC ................................. 370/310–350
See application file for complete search history.

(56) References Cited

U.S. PATENT DOCUMENTS

| | | | | |
|---|---|---|---|---|
| 5,649,286 | A | * | 7/1997 | Frerking ................ 455/435.1 |
| 6,711,408 | B1 | | 3/2004 | Raith |
| 7,088,997 | B1 | | 8/2006 | Boehmke |
| 7,389,109 | B2 | | 6/2008 | Hind et al. |
| 7,778,593 | B2 | | 8/2010 | Hsu et al. |
| 7,848,765 | B2 | | 12/2010 | Phillips et al. |
| 8,270,973 | B2 | * | 9/2012 | Russell ................ 455/435.2 |
| 2003/0032399 | A1 | | 2/2003 | Slupe |
| 2003/0112178 | A1 | * | 6/2003 | Bajikar ................ 342/357.06 |
| 2004/0152472 | A1 | * | 8/2004 | Ono et al. .............. 455/456.1 |
| 2006/0009266 | A1 | * | 1/2006 | Hara et al. ................ 455/572 |
| 2006/0063560 | A1 | | 3/2006 | Herle |

(Continued)

OTHER PUBLICATIONS

U.S. Spectrum Management Policy: Agenda for the Future, 1991.

(Continued)

*Primary Examiner* — Kwang B Yao
*Assistant Examiner* — Juvena Loo
(74) *Attorney, Agent, or Firm* — Renner, Otto, Boisselle & Sklar, LLP

(57) ABSTRACT

Systems and methods of efficiently providing network access for a portable electronic device while moderating power consumption are described. The electronic device may have a cellular radio and a network radio for communicating with an alternative network. In a default state, the electronic device may carry out communications using the cellular radio, and the network radio may be in an off state. Periodically, the electronic device may determine if the electronic device has moved. If so, a location of the electronic device may be determined and a check may be carried out to determine if the electronic device is in range of an available alternative network. If the electronic device is in range of an available alternative network, the network radio may be turned on and an attempt to connect to the alternative network may be made.

20 Claims, 3 Drawing Sheets

(56) References Cited

U.S. PATENT DOCUMENTS

| | | | |
|---|---|---|---|
| 2006/0234713 A1 | 10/2006 | Oswal et al. | |
| 2006/0286982 A1* | 12/2006 | Prakash et al. | 455/435.1 |
| 2007/0129045 A1* | 6/2007 | Aerrabotu | 455/343.5 |
| 2007/0207750 A1 | 9/2007 | Brown et al. | |
| 2008/0004037 A1* | 1/2008 | Achlioptas et al. | 455/456.1 |
| 2008/0102787 A1* | 5/2008 | Landschaft et al. | 455/404.2 |
| 2008/0186882 A1 | 8/2008 | Scherzer et al. | |
| 2010/0067434 A1 | 3/2010 | Siu et al. | |
| 2010/0124924 A1 | 5/2010 | Cheng et al. | |
| 2010/0135178 A1* | 6/2010 | Aggarwal et al. | 370/252 |
| 2010/0330991 A1 | 12/2010 | Sydir et al. | |
| 2012/0033653 A1* | 2/2012 | Kalbag | 370/338 |
| 2012/0155385 A1* | 6/2012 | Bencheikh | 370/328 |

OTHER PUBLICATIONS

Radio Spectrum Management, Module 5 of ICT Regulation Toolkit, ITU, 2007.

International Search Report and Written Opinion from corresponding International Application No. PCT/US12/24097, mailed on May 2, 2012.

* cited by examiner

SYSTEM AND METHOD FOR MANAGING WIRELESS CONNECTIONS AND RADIO RESOURCES

TECHNICAL FIELD OF THE INVENTION

The technology of the present disclosure relates generally to electronic devices and, more particularly, to a system and method for providing network access to electronic devices while managing power consumption.

BACKGROUND

Wireless electronic devices, especially those with a high degree of portability while in use, are becoming increasingly popular. But a challenge for these devices is providing reliable, high speed network access.

Many portable wireless electronic devices rely on cellular networks to support wireless communications and Internet access. Some of these devices also may access the Internet and other network services, including messaging and calling, using alternative types of networks. For instance, many mobile telephones that are currently on the market have cellular communications capabilities and WiFi communications capabilities. But most WiFi networks require access credentials to establish communications with the WiFi network. Access credentials may include a user name and password, a security code (e.g., a wired equivalent privacy key or WEP key), or other certificate or authorization information.

Also, WiFi radios can consume a considerable amount of power when in a scanning mode to search for an available WiFi network. This power consumption can quickly deplete battery charge.

SUMMARY

To improve communications capability of portable electronic devices, the present disclosure describes systems and methods of efficiently providing network access while moderating power consumption by the electronic device. In one embodiment, the electronic device may have a cellular radio (e.g., for communicating under a "3G" protocol or a "4G" protocol) and a network radio for communicating with an alternative network (e.g., for communicating under a WiFi protocol or WiMAX protocol). In a default state, the electronic device may carry out communications using the cellular radio, and the network radio may be in an off state. Periodically, the electronic device may determine if the electronic device has moved. If so, a location of the electronic device may be determined and a check may be carried out to determine if the electronic device is in range of an available alternative network. If the electronic device is in range of an available alternative network, the network radio may be turned on and an attempt to connect to the alternative network may be made. The determination as to whether the electronic device is in range of a alternative network may be carried out by checking the location against cached information regarding alternative networks and/or communicating with an assistance server that provides information regarding alternative networks based on the location of the electronic device.

According to one aspect of the disclosure, a portable electronic device includes a managed radio transceiver for establishing wireless communications; a motion sensor; a control circuit configured to control operation of the radio transceiver, including: monitor output of the motion sensor to determine if the electronic device has moved in a manner that indicates potential for the electronic device to have changed geographic location and, if so: ascertain a current geographical location of the electronic device; and determine if the current location matches a coverage area of a known network device and, if so, activate the managed radio transceiver for establishing the wireless communications.

According to an embodiment of the electronic device, information to determine if the current location matches a coverage area of the known network device is stored by the electronic device.

According to an embodiment of the electronic device, the current geographical location is ascertained using a GPS receiver of the electronic device or using network assistance.

According to an embodiment, the electronic device further includes another radio transceiver for establishing wireless communications with a primary network.

According to an embodiment of the electronic device, the primary network is a cellular network.

According to an embodiment of the electronic device, the managed radio transceiver is a WiFi transceiver.

According to an embodiment of the electronic device, the control circuit is further configured to send a network access request to a network access management system, receive an identification of a network having a coverage area in which the electronic device is located from the network access management system, and activate the managed radio transceiver for establishing the wireless communications with the identified network.

According to an embodiment of the electronic device, the control circuit is further configured to receive access credentials from the network access management system for use in establishing the wireless communications with the identified network.

According to an embodiment of the electronic device, the identified network is not previously known to the electronic device.

According to an embodiment of the electronic device, the control circuit is further configured to store information for the identified network for use in determining if a future location matches a coverage area of the identified network.

According to an embodiment of the electronic device, in a default state when the managed radio transceiver is not used for wireless communications, the managed radio receiver is placed in an inactive state or a sleep state, and the another radio transceiver is placed in an active state.

According to an embodiment of the electronic device, the control circuit is further configured to actively scan for network access with the managed radio transceiver and send a network access request to a network access management system in response to user input to initiate the scan.

According to an embodiment of the electronic device, the control circuit is further configured to display a combined list of networks identified by the scan and networks identified by the network access management system in response to the network access request, and to attempt connection to a user selected one of the displayed networks.

According to another aspect of the disclosure, a method of managing radio communications in a portable electronic device that has a managed radio transceiver for establishing wireless communications and a motion sensor includes monitoring output of the motion sensor to determine if the electronic device has moved in a manner that indicates potential for the electronic device to have changed geographic location and, if so: ascertaining a current geographical location of the electronic device; and determining if the current location matches a coverage area of a known network device and, if so, activating the managed radio transceiver for establishing the wireless communications.

According to an embodiment of the method, information to determine if the current location matches a coverage area of the known network device is stored by the electronic device.

According to an embodiment of the method, the current geographical location is ascertained using a GPS receiver of the electronic device or using network assistance.

According to an embodiment of the method, the electronic device further includes another radio transceiver for establishing wireless communications with a primary network.

According to an embodiment of the method, the primary network is a cellular network.

According to an embodiment of the method, the managed radio transceiver is a WiFi transceiver.

According to an embodiment, the method further includes sending a network access request to a network access management system; receiving an identification of a network having a coverage area in which the electronic device is located from the network access management system; and activating the managed radio transceiver for establishing the wireless communications with the identified network.

According to an embodiment, the method further includes receiving access credentials from the network access management system for use in establishing the wireless communications with the identified network.

According to an embodiment of the method, the identified network is not previously known to the electronic device.

According to an embodiment, the method further includes storing information for the identified network for use in determining if a future location matches a coverage area of the identified network.

According to an embodiment of the method, in a default state when the managed radio transceiver is not used for wireless communications, the managed radio receiver is placed in an inactive state or a sleep state, and the another radio transceiver is placed in an active state.

According to an embodiment, the method further includes actively scanning for network access with the managed radio transceiver and sending a network access request to a network access management system in response to user input to initiate the scan.

According to an embodiment, the method further includes displaying a combined list of networks identified by the scan and networks identified by the network access management system in response to the network access request; and attempting to connect to a user selected one of the displayed networks.

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

DETAILED DESCRIPTION OF EMBODIMENTS

Figure 1:
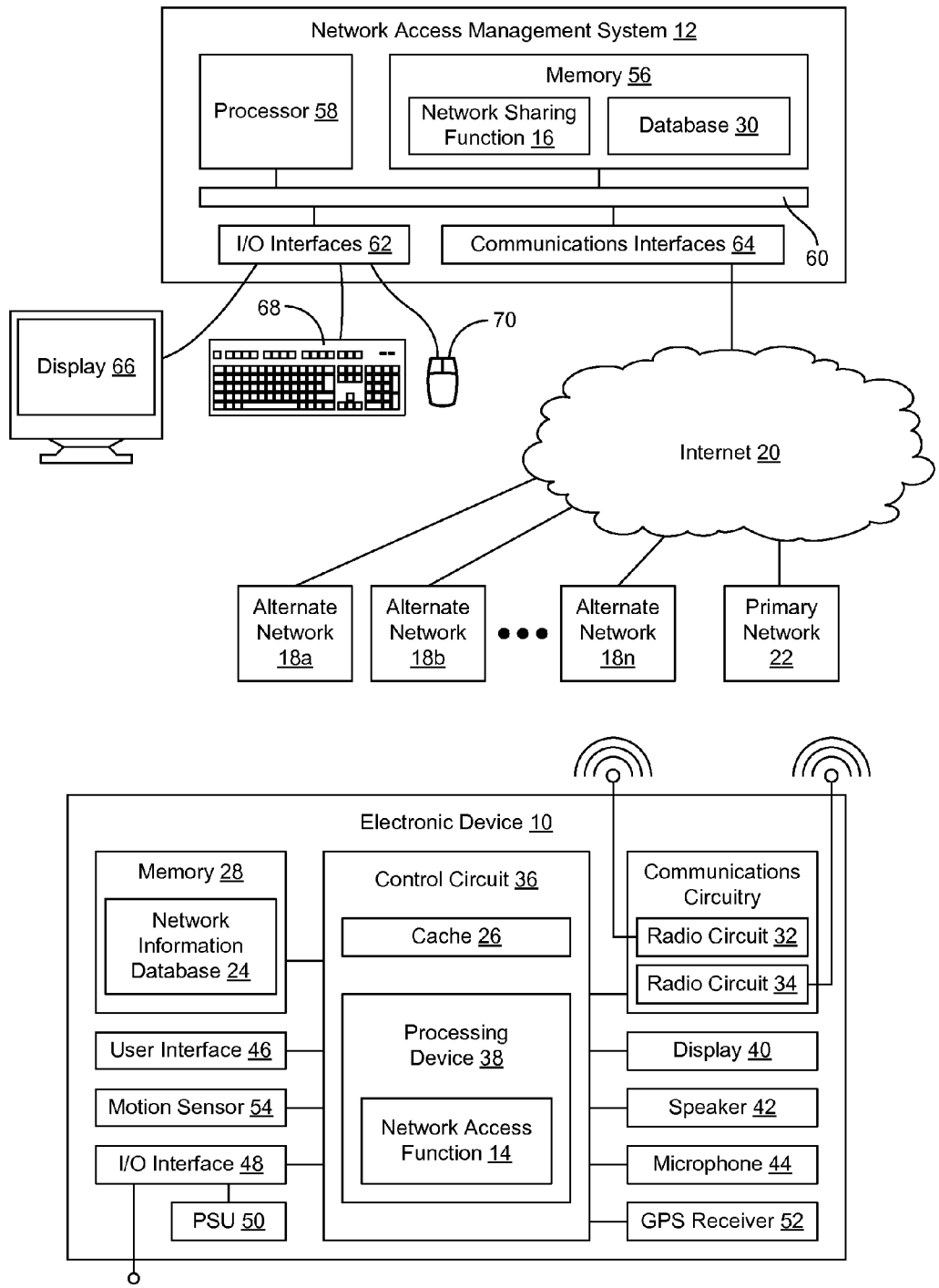
FIG. 1 is a schematic view of a communication system.

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

In the present document, embodiments are described primarily in the context of a portable wireless radio communications device, such as a mobile telephone. For purposes of description, the device will be referred to as an electronic device. It will be appreciated, however, that the exemplary context of a mobile telephone is not the only operational environment in which aspects of the disclosed systems and methods may be used. The disclosed systems and methods may be applied to various types of electronic devices. Therefore, the techniques described in this document may be applied to any type of appropriate electronic device, examples of which include a mobile telephone, a media player, a gaming device, a computer, a personal digital assistant (PDA), an electronic book reader, etc.

In the present document, the electronic device may carry out wireless communications through a primary network. The primary network may be a default network for the electronic device. In the described and illustrated embodiments, the primary network is a cellular network. It will be recognized that other network types may be used for the primary network. In some circumstances, the primary network may not be the preferred network for the electronic device for one or more reasons such as cost, performance, in ability to access certain resources (e.g., a printer or a secure server) through the primary network, etc. Therefore, when available, the electronic device may carry out wireless communications through an alternative network instead of through the primary network or in addition to the primary network. In the described and illustrated embodiments, the alternative networks are WiFi networks. It will be recognized that other network types may be employed for the alternative networks. Also, the alternative networks need not all be of the same type.

Referring initially to FIG. 1, shown is a system that includes an electronic device 10 and a network access management system 12. The electronic device 10 is portable and has wireless communication capabilities, as will be described in greater detail below. The network access management system 12 may be configured as a server that communicates with the electronic device 10 and other devices, as will also be described. The electronic device 10 may include a network access function 14 and the network access management system 12 may include a network sharing function 16. The network access function 14 and the network sharing function 16 may cooperate with each other to assist the electronic device 10 access an alternative network 18.

As illustrated, there may be plural alternative networks 18 (shown as networks 18a through 18n). The networks 18 may be geographically diverse and have distinct coverage areas, although it is possible that two or more networks 18 may have overlapping coverage areas. In the exemplary embodiment where the alternative networks 18 are WiFi networks, each network 18 may include one or more access points (APs) that establish wireless connection with the electronic device 10.

In the exemplary context of a mobile telephone, the electronic device 10 may access the Internet 20 and carry out other communications functions, such as engaging in voice or video calls, and sending or receiving messages (e.g., email messages, text messages, multimedia messages, instant messages, etc.) through a subscription service. In a typical arrangement, the subscription service provides access to a primary network 22. In one embodiment, the primary network 22 may be a cellular network that includes base stations for establishing wireless connection with the electronic device 10. It will be appreciated that, in the case of a cellular network, the primary network 22 may have a multitude of base stations to service a wide geographic area.

From time to time, the electronic device 10 may become located within communication range of one or more of the alternative networks 18. It may be advantageous for the electronic device 10 to access the Internet 20 through the alternative network 18 and/or carry out other communication tasks (e.g., engage in calls and/or messaging) through the alternative network 18. But continuously scanning for alternative networks 18 can deplete battery charge at a faster rate than is desirable. The network access function 14 controls the scanning for the alternative network 18 to conserve battery power, maximize use of alternative networks 18 when possible, and minimize user involvement for ease of use. The technique may include coordination of login and/or access credentials (e.g., user names, passwords, keys, tokens, etc.) for the electronic device 10 so that, in some situations, the user need not have to seek out network access information for entry by the user.

It will be appreciated that each alternative network 18 may be operated by an individual or an entity. The user of the electronic device 10 may be frequently present in the communication range of one or more of the networks 18. For instance, one of the networks 18 may be established in the user's home or residence using a single wireless router as an access point for the network 18. As another example, an entity, such as a business or school, may deploy one of the networks 18 using one or more access points to cover a geographic area that the user travels to for work or attend classes. In another example, one of the networks 18 may be deployed by a restaurant, coffee shop, airport, or other location that the user goes to on a relatively frequent basis. The electronic device 10 may store information about one or more of the networks 18. The stored information may include locations from which the networks 18 are accessible and login or access credentials. In one embodiment, the information may be stored in a network information database 24 resident in the electronic device 10. In one embodiment, during at least some stages of the operation of the network access function 14, the stored network information may be placed in cache 26 for fast reference. The network information database 24, however, may be stored in a memory 28 for long term, non-volatile data storage.

Information about additional alternative networks 18 may be stored by the network access management system 12 in another network information database 30. This data may be used by the network access management system 12, in conjunction with the network sharing function 16, to supply network information to the electronic device 10 when the electronic device 10 is located within the communication range of one of the networks 18 that are known to the network access management system 12. In this manner, the electronic device 10 may learn of potentially available networks 18 that are not stored by the electronic device 10 and may acquire data needed to access the networks 18 (e.g., login information and/or access credentials).

As indicated, for purposes of description, the networks 18 may be WiFi networks (e.g., a network operating in accordance with IEEE 802.11). But one or more of the networks 18 need not be a WiFi network. Other exemplary types of networks include, but are not limited to, a WiMAX network (e.g., a network operating in accordance with IEEE 802.16), an enhanced data rates for global system for mobile communications (GSM) evolution (EDGE) network, a wideband code division multiple access (WCDMA) network, etc.

Each of the network access function 14 and the network sharing function 16 may be embodied as a set of executable instructions (e.g., code, programs, or software) that are respectively resident in and executed by the electronic device 10 and the network access management system 12. The functions 14 and 16 each may be one or more programs that are stored on respective non-transitory computer readable mediums, such as one or more memory devices (e.g., an electronic memory, a magnetic memory, or an optical memory). In the following description, ordered logical flows for the functionality of the connectivity function 14 and the network access function 16 are described. It will be appreciated that the logical progression may be implemented in an appropriate manner, such as an object-oriented manner or a state-driven manner.

As indicated, the electronic device 10 may be configured as a multi-mode device to carry out wireless communications using plural types of connectivity options. For this purpose, the electronic device 10 may include communications circuitry. In the illustrated exemplary embodiment, the electronic device 10 includes a radio circuit assembly 32 (also referred to as a radio transceiver or a default radio transceiver) for establishing communications with the primary network 22 (also referred to as a default network) and another radio circuit assembly 34 (also referred to as a radio transceiver or a managed radio transceiver) for establishing communication with the alternative networks 22. Although the radio circuit assemblies 32 and 34 are illustrated as being separate, it is possible that they may share components such as a tuning circuit, an antenna, etc. Also, the electronic device 10 may be able to communicate over more than one type of network connection. Therefore, the illustrated components may represent one or more than one radio transceiver, depending on capabilities of the implementing hardware to tune to multiple frequencies and carry out communications using multiple protocols.

In the case where the primary network 22 and/or one of the alternative networks is a cellular communications network, then the electronic device 10 may be configured for interaction with an appropriate mobile telephone network standard. Exemplary cellular communications networks include, by are not limited to, networks operating in accordance with GSM, EDGE, WCDMA, integrated services digital broadcasting (ISDB), high speed packet access (HSPA), or any other appropriate standard or advanced versions of these standards. The cellular communications networks may be compatible with 3G and/or 4G protocols. Additionally, the electronic device 10 also may be configured to communicate with other types of networks, such as a packet-switched network. An exemplary packet-switched network includes a network configured in accordance with IEEE 802.11 (e.g., IEEE 802.11a, IEEE 802.11b, or IEEE 802.11n), each of which are commonly referred to as WiFi. Another exemplary packet-switched network includes a network configured in accordance with IEEE 802.16 (commonly referred to as WiMAX).

Overall functionality of the electronic device 10 may be controlled by a control circuit 36 that includes a processing device 38. The processing device 38 may execute code stored in a memory (not shown) within the control circuit 36 and/or in a separate (e.g., memory 28) in order to carry out the operations of the electronic device 10. For instance, the processing device 38 may be used to execute the network access function 14. The memory 28 may be, for example, one or more of a buffer, a flash memory, a hard drive, a removable media, a volatile memory, a non-volatile memory, a random access memory (RAM), or other suitable device. In a typical arrangement, the memory 28 may include a non-volatile memory for long term data storage and a volatile memory that functions as system memory for the control circuit 36. The memory 28 may exchange data with the control circuit 36 over a data bus. Accompanying control lines and an address bus between the memory 28 and the control circuit 36 also may be present.

Another component of the electronic device 10 may be a display 40 that is used to display visual information to a user. The electronic device 10 may include a speaker 42 and a microphone 44 to allow the user to carry out voice conversations. A user interface 46, such as a keypad and/or a touch screen associated with the display 40, may be present to provide for a variety of user input operations.

The electronic device 10 may further include one or more input/output (I/O) interface(s) 48. The I/O interface(s) 48 may include one or more electrical connectors for connecting the electronic device 10 to another device (e.g., a computer) or an accessory (e.g., a personal handsfree (PHF) device) via a cable, and/or for connecting the electronic device 10 to a power supply. Therefore, operating power may be received over the I/O interface(s) 48 and power to charge a battery of a power supply unit (PSU) 50 within the electronic device 10 may be received over the I/O interface(s) 48. The PSU 50 may supply power to operate the electronic device 10 in the absence of an external power source.

A position data receiver, such as a global positioning system (GPS) receiver 52, may be involved in determining the location of the electronic device 10. Also, movement of the electronic device 10 may be sensed with one or more motion sensors 54. In one embodiment, the motion sensors 54 are accelerometers.

The electronic device 10 also may include various other components. For instance, a camera (not shown) may be present for taking digital pictures and/or movies. Image and/or video files corresponding to the pictures and/or movies may be stored in the memory 28.

The network access management system 12 may be implemented as a computer-based system that is capable of executing computer applications (e.g., software programs), including the network sharing function 16. The network sharing function 16, and the affiliated network information database 30, may be stored on a non-transitory computer readable medium, such as a memory 56. The memory 56 may be a magnetic, optical or electronic storage device (e.g., hard disk, optical disk, flash memory, etc.), and may comprise several devices, including volatile and non-volatile memory components. Accordingly, the memory 56 may include, for example, random access memory (RAM) for acting as system memory, read-only memory (ROM), hard disks, optical disks (e.g., CDs and DVDs), tapes, flash devices and/or other memory components, plus associated drives, players and/or readers for the memory devices. To execute the network sharing function 16, the network access management system 12 may include one or more processors 58 used to execute instructions that carry out logic routines. The processor 58 and the components of the memory 56 may be coupled using a local interface 60. The local interface 60 may be, for example, a data bus with accompanying control bus, a network, or other subsystem.

The network access management system 12 may have various input/output (I/O) interfaces 62 as well as one or more communications interfaces 64. The interfaces 62 may be used to operatively couple the network access management system 12 to various peripherals, such as a display 66, a keyboard 68, a mouse 70, etc. The communications interface 64 may include for example, a modem and/or a network interface card. The communications interface 64 may enable the network access management system 12 to send and receive data signals, voice signals, video signals, and the like to and from other computing devices via an external network. In particular, the communications interface 64 may connect the network access management system 12 to the Internet 20.

Systems and methods of providing the electronic device 10 with access to the alternative networks 18 will be described in detail. The techniques may be implemented in a manner that is independent of network subscriptions or service plans of the electronic device 10 and may be implemented in a manner that is independent of predetermined or current network association of the electronic device 10.

Figure 2:
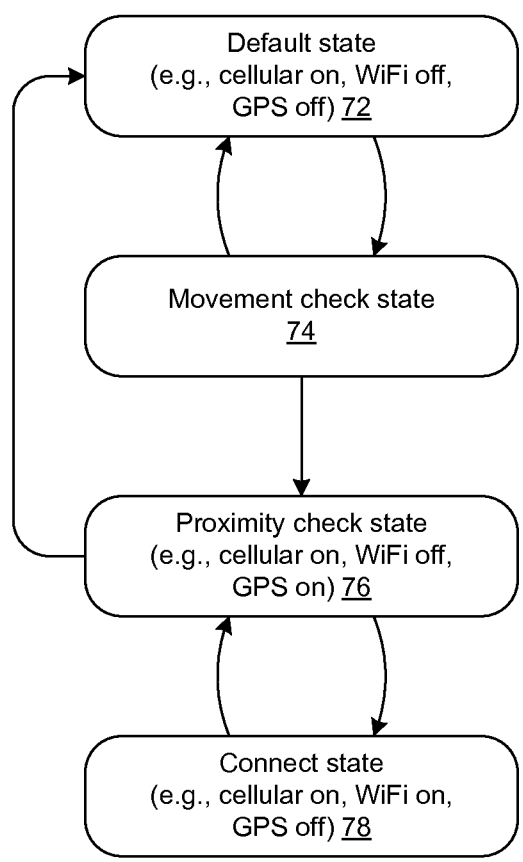
FIG. 2 is an exemplary state diagram for managing wireless connections in an electronic device.

With additional reference to FIG. 2, illustrated are logical operations to implement an exemplary method of managing network connections for the electronic device 10. FIG. 2 is a state diagram of logical states of the electronic device 10. But it will be appreciated that the state diagram represents a method of managing wireless connections. It will be further appreciated that the method may be carried out, at least in part, by executing the network access function 16, for example. Thus, the state diagram of FIG. 2 may be thought of as depicting a method carried out by the electronic device 10. Furthermore, the network access management system 12 may cooperate with the electronic device 10. As such, cooperating actions taken out by the network access management system 12 may represent a method carried out by the network access management system 12.

The network access management technique may begin in a default state 72. In the default state 72, the radio for communicating with the primary network 22 (e.g., the radio circuit 32) may be in an active state (e.g., "on") so that communications with the primary network 22 are enabled. Also, the radio for communicating with the alternative networks 22 (e.g., the radio circuit 34) may be in an inactive or sleep state (e.g., "off") to conserve power. In addition, the GPS receiver 52 may be in an inactive or sleep state (e.g., "off") to conserve power.

During the default state 72, movement of the electronic device 10 may be tracked. In one embodiment, movement may be tracked by monitoring output signals from the motion sensor(s) 44 as an indication of possible change in location. If the electronic device 10 experiences movement to generate output signals over a predetermined threshold, it may be assumed that the electronic device 10 is in motion. As examples, these signals may correspond to movement of the electronic device 10 as the user walks and carries the electronic device 10, or movement of the electronic device 10 as a result from travelling in a car or in a train.

From the default state, the electronic device 10 may transition to a movement check state 74. The transition may be made on a periodic basis (e.g., once every 15 seconds, once every 30 seconds, once a minute, once every five minutes, or some other period of time) and/or on a triggering event (e.g., the electronic device 10 has been determined to be in continuous motion for more than a predetermined period of time and then comes to a rest). In the movement check state 74, a determination may be made as to whether it is possible that the electronic device 10 has changed location since a last location check. For example, a positive movement result may be made if the output signals from the motion sensors 54 indicate that the electronic device was in motion for a cumulative period of time that exceeds a predetermined length of time. The cumulative period of time corresponding to motion may be tracked starting with the last time the electronic device entered a proximity check state 76. Also, the movement need not be continuous. Rather, there may be pauses in movement that do not detract from the count of cumulative amount of time that the electronic device 10 is considered to have moved.

If it is determined that the electronic device 10 did not move in the movement check state 74, the logical flow may return to the default state 72. But if movement indicates that it is possible that a change in location has occurred, the logical flow may proceed to the proximity check state 76. It is recognized that certain movements of the electronic device 10 may result in a "false positive" result from the movement check state 74. For example, use of the electronic device 10 to play a game, to carry out a telephone conversation, or to listen to music while exercising on a treadmill all may result in movement that could satisfy the check of the movement check state 74. In some embodiments, false positives may be acceptable and a location check in the proximity check state 76 may be used to determine if change in location has occurred. In other embodiments, the occurrence of false positives may be reduced by ignoring movement that occurs while the electronic device 10 is used in certain operational modes.

In the proximity check state 76, the radio circuit 32 may remain active and the radio circuit 34 may remain inactive. But the GPS receiver 52 may be activated to acquire location information. Therefore, in this embodiment, the GPS receiver 52 is used to fetch new geo-coordinates only after determining, using accelerometer feedback, that the electronic device 10 has potentially moved by a predetermined threshold amount. From the location information, a current location of the electronic device 10 may be determined. Other techniques for determining location are possible, such as determining location based on the identity of a base station of the primary network 22 that services the electronic device 10, by triangulation, by assisted-GPS (AGPS), or other appropriate technique. If a location cannot be ascertained automatically (e.g., GPS location assessment fails because the electronic device 10 is indoors), the user may be requested to enter a location, such as a street address or select a location from a displayed map.

Once the location is determined, the electronic device 10 may determine if the location is in the coverage area of one of the alternative networks 18. This determination may be made by comparing the determined location against prior locations at which the electronic device 10 was able to connect to one of the alternative networks 18. These locations and the corresponding alternative network 18 information (e.g., network name, login or access credentials, etc.) may be stored by the electronic device 10 in the network information database 24. To populate the network information database 24, the electronic device 10 may store location and network information each time the electronic device 10 is able to connect with one of the networks 18.

Another technique for determining whether the electronic device 10 is in the coverage area of one of the alternative networks 18 is to transmit a network access request to the network access management system 12. The request may identify the electronic device 10 and the current location of the electronic device 10. The network access management system 12 may compare the current location of the electronic device 10 against known coverage areas of the alternative networks 18 to identify whether the electronic device 10 is in a coverage area of one of the networks 18. If so, the network access management system 12 may transmit information to identify the network 18 to the electronic device 10. In some embodiments, the network access management system 12 also may transmit login and/or access credentials for the network 18 to the electronic device 10. Before transmitting this information, the network access management system 12 may determine if the electronic device 10 has authorization to use the network 18. This authorization may be obtained by permission of an owner of the network 18, may result from a subscription status of the electronic device 10, may result from the identity of the user of the electronic device 10, or from other appropriate criteria.

If it is determined that the current location of the electronic device 10 does not match one of the alternative networks 18, then the logical flow may return to the default state.

If it is determined that the current location of the electronic device 10 matches the coverage area of one of the alternative networks 18, then the logical flow may proceed to a connect state 78. In the connect state 78, the radio circuit 34 may be activated and the GPS receiver 52 may be deactivated. Then, the electronic device 10 may scan for and connect with the network 18 and carry out wireless communications using the network 18. Therefore, in exemplary embodiments, the radio circuit 34 automatically scans for networks only after determining, using motion and location feedback, that the electronic device 10 is likely to be in the communication range of one of the networks 18. In one embodiment, the connection to the network 18 may be made automatically (e.g., without user involvement during the progression through the states from the default state 72 to the connection state 78) and/or transparently from a security perspective (e.g., access credentials are not known and/or entered by the user). If more than one network 18 is identified, preference may be given to locally stored networks 18 over networks 18 identified by the network access management system 12. If more than one locally stored networks 18 is identified, the network 18 with the highest signal strength may be used. If more than one network 18 is identified by the network access management system 12, the networks 18 may be ranked in order of connection preference based on cost of use, expected throughput, and/or any other appropriate criteria.

If a connection cannot be established, if performance is found to be below a predetermined threshold, or if the connection is lost, the radio circuit 34 may be deactivated and the logical flow may return to one of the default state 72 or the proximity check state 76.

It will be recognized that the user may initiate a scan for one of the networks 18 at any time. In this situation, the radio circuit 34 may be activated and a scan for compatible networks may be made. In one embodiment, a user initiated scan for one of the networks also may include ascertaining a location of the electronic device 10 and transmitting a network access request, as described above, to the network access management system 12. The identity of each potentially available network, as identified by active scanning with the radio circuit 34 and/or as identified by the network access management system 12, may be presented to the user in a list. The user may select one of the networks from the list in order to attempt to establish a connection. It will be appreciated that if the electronic device 10 is already connected to a network, the user may select a different network and the connection may be switched. If connection is made to a network that is previously unknown to the electronic device 10, then location and corresponding network information may be stored by the electronic device 10 for future reference in the disclosed network access management techniques. If connection to an unknown network is made, it is possible that the user may be required to take certain manual actions to access the network, such as identify and enter any login or security credential information needed for accessing the network, access a default webpage for the network, etc.

These techniques allow for the management of wireless connections in an electronic device while conserving power by minimizing the time that a radio circuit searches for a compatible network. The times at which the radio circuit searches for a compatible network may be restricted to times when there is a high probability that the electronic device is in the coverage area of the network. Also, use of a GPS receiver for ascertaining location information is minimized by monitoring movement of the device for circumstances when the electronic device actually may have moved from one location to another. To facilitate implementation of these techniques, knowledge of existing networks is stored and used as part of the determination process as to when to activate the radio circuit. The knowledge of existing networks may be stored in the electronic device as a result of logging location and network information whenever the electronic device associates with a new network or access point. Additional knowledge of existing networks may be stored by a remote server that assists the electronic device in making network connections. In this manner, the wireless radio may be inactivated (e.g., turned off) when the electronic device is not in targeted locations or locations with known network access, and may be activated (e.g., turned on) when the electronic device is at targeted locations or locations with known network access.

Figure 3:
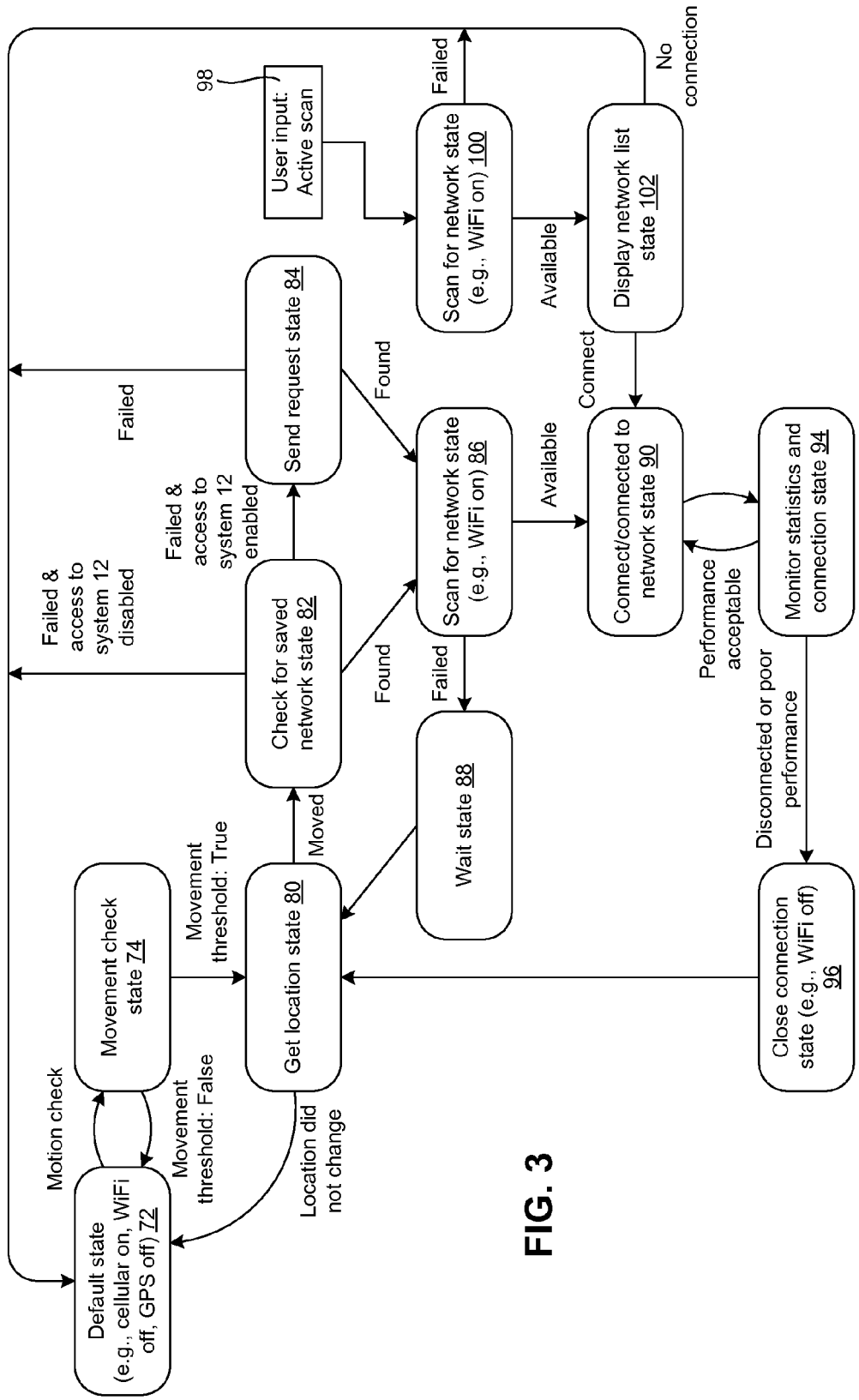
FIG. 3 is another exemplary state diagram for managing wireless connections in an electronic device.

With additional reference to FIG. 3, illustrated is another exemplary state diagram for managing wireless connections in an electronic device. Similar to the state diagram of FIG. 2, FIG. 3 illustrates logical operations to implement an exemplary method of managing network connections for the electronic device 10. It will be appreciated that the state diagram represents a method of managing wireless connections. It will be further appreciated that the method may be carried out, at least in part, by executing the network access function 16, for example. Thus, the state diagram of FIG. 3 may be thought of as depicting a method carried out by the electronic device 10. Furthermore, the network access management system 12 may cooperate with the electronic device 10. As such, cooperating actions taken out by the network access management system 12 may represent a method carried out by the network access management system 12. States in FIG. 3 that are the same as or are similar to the states in FIG. 2 will be given the same references numbers.

The network access management technique may begin in the default state 72. In the default state 72, the radio for communicating with the primary network 22 (e.g., the radio circuit 32) may be in an active state (e.g., "on") so that communications with the primary network 22 are enabled. Also, the radio for communicating with the alternative networks 22 (e.g., the radio circuit 34) may be in an inactive or sleep state (e.g., "off") to conserve power. In addition, the GPS receiver 52 may be in an inactive or sleep state (e.g., "off") to conserve power.

In one embodiment, the electronic device 10 may not include the radio circuit 32 for communicating with the primary network (e.g., may not include a cellular radio) or may not have access to the primary network (e.g., the radio circuit 32 may be off or the user may not have subscribed to a service to access the primary network). In this case, the logical flow may still progress to attempt to identify proximity to a known alternative network 18 (e.g., to establish a WiFi connection).

During the default state 72, movement of the electronic device 10 may be tracked. In one embodiment, movement may be tracked by monitoring output signals from the motion sensor(s) 44 as an indication of possible change in location. If the electronic device 10 experiences movement to generate output signals over a predetermined threshold, it may be assumed that the electronic device 10 is in motion. As examples, these signals may correspond to movement of the electronic device 10 as the user walks and carries the electronic device 10, or movement of the electronic device 10 as a result from travelling in a car or in a train.

From the default state, the electronic device 10 may transition to the movement check state 74. The transition may be made on a periodic basis (e.g., once every 15 seconds, once every 30 seconds, once a minute, once every five minutes, or some other period of time) and/or on a triggering event (e.g., the electronic device 10 has been determined to be in continuous motion for more than a predetermined period of time and then comes to a rest). In the movement check state 74, a determination may be made as to whether it is possible that the electronic device 10 has changed location since a last location check. For example, a positive movement result may be made if the output signals from the motion sensors 54 indicate that the electronic device was in motion for a cumulative period of time that exceeds a predetermined length of time. The cumulative period of time corresponding to motion may be tracked starting with the last time the electronic device entered a location check state 80. Also, the movement need not be continuous. Rather, there may be pauses in movement that do not detract from the count of cumulative amount of time that the electronic device 10 is considered to have moved.

If it is determined that the electronic device 10 did not move in the movement check state 74, the logical flow may return to the default state 72. But if movement indicates that it is possible that a change in location has occurred, the logical flow may proceed to the location check state 80. It is recognized that certain movements of the electronic device 10 may result in a "false positive" result from the movement check state 74. For example, use of the electronic device 10 to play a game, to carry out a telephone conversation, or to listen to music while exercising on a treadmill all may result in movement that could satisfy the check of the movement check state 74. In some embodiments, false positives may be acceptable and a location check in the proximity check state 76 may be used to determine if a change in location has occurred. In other embodiments, the occurrence of false positives may be reduced by ignoring movement that occurs while the electronic device 10 is used in certain operational modes.

In the location check state 80, the radio circuit 32 may remain active and the radio circuit 34 may remain inactive. But the GPS receiver 52 may be activated to acquire location information. Therefore, in this embodiment, the GPS receiver 52 is used to fetch new geo-coordinates only after determining, using accelerometer feedback, that the electronic device 10 has potentially moved by a predetermined threshold amount. From the location information, a current location of the electronic device 10 may be determined. Other techniques for determining location are possible, such as determining location based on the identity of a base station of the primary network 22 that services the electronic device 10, by triangulation, by assisted-GPS (AGPS), or other appropriate technique. If a location cannot be ascertained automatically (e.g., GPS location assessment fails because the electronic device 10 is indoors), the user may be requested to enter a location, such as a street address or select a location from a displayed map.

Once the location is determined, the GPS receiver 52 may be deactivated and the electronic device 10 may determine if the location has changed since a prior location check. If the location has not changed or the current location cannot be ascertained, the logical flow may return to the default state 72. If a change in location has been made, the electronic device 10 may transition to a saved network check state 82. In the saved network check state 82, the electronic device 10 may determined if the electronic device is in the coverage area of one of the alternative networks 18. This determination may be made by comparing the determined location against prior locations at which the electronic device 10 was able to connect to one of the alternative networks 18. These locations and the corresponding alternative network 18 information (e.g., network name, login or access credentials, etc.) may be stored by the electronic device 10 in the network information database 24. To populate the network information database 24, the electronic device 10 may store location and network information each time the electronic device 10 is able to connect with one of the networks 18.

If it is determined in state 82 that the electronic device 10 is not at a location in which connection to one of the networks 18 may be made and access to the network access management system 12 is disabled, then the logical flow may return to the default state 72. Access to the network access management system 12 may be disabled for a variety of reasons, such as the electronic device 10 not having communications capability through the primary network 22, or the user of the electronic device 10 may not have subscription or access privileges to obtain information about the alternative networks 18 from the network access management system 12.

If it is determined in state 82 that the electronic device 10 is not at a location in which connection to one of the networks 18 may be made and access to the network access management system 12 is available, then the logical flow may proceed to a transmit request state 84. In state 84, the electronic device 10 may transmit a network access request to the network access management system 12. The request may identify the electronic device 10 and the current location of the electronic device 10. In response, the network access management system 12 may compare the current location of the electronic device 10 against known coverage areas of the alternative networks 18 to identify whether the electronic device 10 is in a coverage area of one of the networks 18. If the network access management system 12 determines that the electronic device 10 is not in the coverage area of a known alternative network 18, the network access management system 12 may transmit a negative reply to the electronic device 10, in which case the electronic device may transition back to the default state 72.

If the network access management system 12 determines that the electronic device 10 is in the coverage area of an alternative network 18 to which the electronic device 10 has authorization or may obtain authorization to access, the network access management system 12 may transmit information to identify the network 18 to the electronic device 10. If the network access management system 12 identifies more than one alternative network 18, the identified networks 18 may be ranked to indicate which network 18 may be more preferential to the user of the electronic device 10. In some embodiments, the network access management system 12 also may transmit login and/or access credentials for the network 18 to the electronic device 10. Before transmitting this information, the network access management system 12 may determine if the electronic device 10 has authorization to use the network 18. This authorization may be obtained by permission of an owner of the network 18, may result from a subscription status of the electronic device 10, may result from the identity of the user of the electronic device 10, or from other appropriate criteria.

Following positive results in either the check for saved networks state 82 or the send request state 84 (e.g., it is determined that the current location of the electronic device 10 matches the coverage area of one of the alternative networks 18), the electronic device 10 may transition to a scan for network state 86. In the scan for network state 86, the radio circuit 34 may be activated. Then, the electronic device 10 may scan for the previously identified network 18 or any other networks 18 that may be sensed from the current location. If one of the networks 18 cannot be found, the electronic device may transition to a wait state 88. In the wait state, the electronic device 10 may wait for a predetermined period of time (e.g., 15 seconds, 30 seconds, one minute, or some other duration). After the period of time elapses, the electronic device 10 may transition back to the get location state 80.

If, in the scan for network state 86, one of the networks 18 is found, the electronic device may transition to a connection state 90 in which connection to the found network 18 is made. In one embodiment, the connection to the network 18 may be made automatically (e.g., without user involvement during the progression through the states from the default state 72 to the connection state 90) and/or transparently from a security perspective (e.g., access credentials are not known and/or entered by the user). In the connection state 90, the electronic device 10 may carry out wireless communications using the connection with the network 18. During the connection state 92, the electronic device 10 may monitor the connection by entering a monitoring state 94 to monitor statistics regarding connection quality. The electronic device may monitor, for example, signal strength, data rate, packet errors and so forth. Also, the electronic device 10 may periodically check to determine if the connection with the network 18 is still active. If the connection is maintained and the performance, as indicated by the monitored statistics, is acceptable, the connection may be maintained in state 90. But if the connection is lost or if the performance is poor, the electronic device 10 may transition to a close connection state 96 in which the radio circuit is inactivated. Following the close connection state 96, the electronic device 10 may transition back to the get location state 80. Therefore, in exemplary embodiments, the radio circuit 34 automatically scans for networks only after determining, using motion and location feedback, that the electronic device 10 is likely to be in the communication range of one of the networks 18.

At any time during the logical operation of the network access function 14, the user may initiate an active scan for one or more of the networks at block 98. In this situation, the electronic device 10 may enter a scan for network state 100. In the scan for network state 100, the radio circuit 34 may be activated (if not already) and a scan for compatible networks may be made. In one embodiment, a user initiated scan for one of the networks 18 also may include ascertaining a location of the electronic device 10 and transmitting a network access request, as described above, to the network access management system 12. If no networks are found by scanning or by the network access management system 12, the electronic device 10 may transition back to the default state 72.

If one or more networks 18 are identified by scanning and/or by the network access management system 12, the identity of each identified network may be presented to the user in a list in a display network state 102. The user may select one of the networks from the list in order to attempt to establish a connection, in which case the electronic device 10 may transition to the connection state 90. It will be appreciated that if the electronic device 10 is already connected to a network, the user may select a different network and the connection may be switched. If connection is made to a network that is previously unknown to the electronic device 10, then location and corresponding network information may be stored by the electronic device 10 for future reference in the disclosed network access management techniques. In one embodiment, an automatic connection to one of the networks 18 may be made if a network 10 is found after the user initiates a network scan. If the user does not select a network or cancels the scan operation, the electronic device 10 may transition back to the default state 72.

Although certain embodiments have been shown and described, it is understood that equivalents and modifications falling within the scope of the appended claims will occur to others who are skilled in the art upon the reading and understanding of this specification.

What is claimed is:

1. A portable electronic device, comprising:
a managed radio transceiver for establishing wireless communications;
a motion sensor, the motion sensor outputting signals responsive to motion of the electronic device;
a control circuit operatively connected to the managed radio transceiver and the motion sensor, and controls operation of the managed radio transceiver, including:
monitor the output signals of the motion sensor to determine if the electronic device has experienced motion that cumulatively and over time indicates potential for the electronic device to have changed geographic location since a most recent determination of actual location and, if so:
ascertain a current geographical location of the electronic device with an element of the portable electronic device separate from the motion sensor; and
determine if the current location matches a coverage area of a known network device compatible with the managed radio transceiver and, if so, activate the managed radio transceiver and engage in wireless communications via the managed radio transceiver; and further comprising another radio transceiver for establishing wireless communications with a primary network, the another radio transceiver having a default operational state of active and the managed radio transceiver having a default operational state of inactive; and
wherein the control circuit is further configured to send a network access request to a network access management system, receive an identification of a network having a coverage area in which the electronic device is located from the network access management system, and activate the managed radio transceiver for establishing the wireless communications with the identified network; and
wherein the identified network is not previously known to the electronic device.

2. The electronic device of claim 1, wherein information to determine if the current location matches a coverage area of the known network device is stored by the electronic device.

3. The electronic device of claim 1, wherein the element that ascertains current geographical location is a GPS receiver of the electronic device or another radio transceiver for establishing wireless communications with a primary network that uses network assistance for location determination, and the motion sensor is an accelerometer.

4. The electronic device of claim 1, wherein the primary network is a cellular network.

5. The electronic device of claim 1, wherein the managed radio transceiver is a WiFi transceiver.

6. The electronic device of claim 1, wherein the control circuit is further configured to receive access credentials from the network access management system for use in establishing the wireless communications with the identified network.

7. The electronic device of claim 1, wherein the control circuit is further configured to store information for the identified network for use in determining if a future location matches a coverage area of the identified network.

8. The electronic device of claim 1, wherein in a default state when the managed radio transceiver is not used for wireless communications, the managed radio receiver is placed in an inactive state or a sleep state, and the another radio transceiver is placed in an active state.

9. The electronic device of claim 1, wherein the control circuit is further configured to actively scan for network access with the managed radio transceiver and send a network access request to a network access management system in response to user input to initiate the scan.

10. The electronic device of claim 9, wherein the control circuit is further configured to display a combined list of networks identified by the scan and networks identified by the network access management system in response to the network access request, and to attempt connection to a user selected one of the displayed networks.

11. A method of managing radio communications in a portable electronic device, the electronic device having a managed radio transceiver for establishing wireless communications and a motion sensor, the motion sensor outputting signals responsive to motion of the electronic device, the method comprising:
monitoring the output signals of the motion sensor to determine if the electronic device has experienced motion that cumulatively and over time indicates potential for the electronic device to have changed geographic location since a most recent determination of actual location and, if so:
ascertaining a current geographical location of the electronic device with an element of the portable electronic device separate from the motion sensor; and
determining if the current location matches a coverage area of a known network device compatible with the managed radio transceiver and, if so, activating the managed radio transceiver and engaging in wireless communications via the managed radio transceiver; and wherein the electronic device further includes another radio transceiver for establishing wireless communications with a primary network, the another radio transceiver having a default operational state of active and the managed radio transceiver having a default operational state of inactive; and
the method further comprising:
sending a network access request to a network access management system;
receiving an identification of a network having a coverage area in which the electronic device is located from the network access management system; and
activating the managed radio transceiver for establishing the wireless communications with the identified network; and
wherein the identified network is not previously known to the electronic device.

12. The method of claim 11, wherein information to determine if the current location matches a coverage area of the known network device is stored by the electronic device.

13. The method of claim 11, wherein the element that ascertains current geographical location is a GPS receiver of the electronic device or the another radio transceiver for establishing wireless communications with a primary network that uses network assistance for location determination, and the motion sensor is an accelerometer.

14. The method of claim 11, wherein the primary network is a cellular network.

15. The method of claim 11, wherein the managed radio transceiver is a WiFi transceiver.

16. The method of claim 11, further comprising receiving access credentials from the network access management system for use in establishing the wireless communications with the identified network.

17. The method of claim 11, further comprising storing information for the identified network for use in determining if a future location matches a coverage area of the identified network.

18. The method of claim 11, wherein in a default state when the managed radio transceiver is not used for wireless communications, the managed radio receiver is placed in an inactive state or a sleep state, and the another radio transceiver is placed in an active state.

19. The method of claim 11, further comprising actively scanning for network access with the managed radio transceiver and sending a network access request to a network access management system in response to user input to initiate the scan.

20. The method of claim 19, further comprising:
displaying a combined list of networks identified by the scan and networks identified by the network access management system in response to the network access request; and
attempting to connect to a user selected one of the displayed networks.

* * * * *